(12) United States Patent
McHenry

(10) Patent No.: US 12,699,265 B2
(45) Date of Patent: Aug. 4, 2026

(54) ONCOMING LIGHT REDUCTION USING DESTRUCTIVE INTERFERENCE

(71) Applicant: Panasonic Automotive Systems Company of America, Division of Panasonic Corporation of North America, Peachtree City, GA (US)

(72) Inventor: Jacob McHenry, Fayetteville, GA (US)

(73) Assignee: Panasonic Automotive Systems America, LLC., Peachtree City, GA (US)

( * ) Notice: Subject to any disclaimer, the term of this patent is extended or adjusted under 35 U.S.C. 154(b) by 636 days.

(21) Appl. No.: 18/129,181

(22) Filed: Mar. 31, 2023

(65) Prior Publication Data

US 2023/0418057 A1 Dec. 28, 2023

Related U.S. Application Data

(60) Provisional application No. 63/356,252, filed on Jun. 28, 2022.

(51) Int. Cl.
| | |
|---|---|
| *G02B 27/01* | (2006.01) |
| *B60J 3/04* | (2006.01) |
| *B60K 35/233* | (2024.01) |
| *B60K 35/235* | (2024.01) |
| *B60K 35/40* | (2024.01) |
| *B60K 35/81* | (2024.01) |
| *G01J 1/42* | (2006.01) |
| *G06F 3/01* | (2006.01) |
| *G06V 20/58* | (2022.01) |
| *G09G 3/00* | (2006.01) |
| *B60K 35/10* | (2024.01) |

(Continued)

(52) U.S. Cl.
CPC ............ *G02B 27/0101* (2013.01); *B60J 3/04* (2013.01); *B60K 35/233* (2024.01); *B60K 35/235* (2024.01); *B60K 35/415* (2024.01); *B60K 35/81* (2024.01); *G01J 1/42* (2013.01); *G02B 27/0179* (2013.01); *G06F 3/013* (2013.01); *G06V 20/584* (2022.01); *G09G 3/002* (2013.01); *B60K 35/10* (2024.01); *B60K 2360/149* (2024.01); *G02B 2027/0118* (2013.01); *G02B 2027/0138* (2013.01); *G02B 2027/0187* (2013.01); *G09G 2354/00* (2013.01); *G09G 2380/10* (2013.01)

(58) Field of Classification Search
CPC ............ G02B 27/0101; G02B 27/0179; G02B 2027/0118; G02B 2027/0138; G02B 2027/0187; G02B 2027/014; B60J 3/04; B60J 3/00; B60K 35/233; B60K 35/235; B60K 35/415; B60K 35/81; B60K 35/10; B60K 2360/149; G01J 1/42; G06F 3/013; G06F 3/011; G06V 20/584; G06V 20/59; G06V 40/18; G09G 3/002; G09G 2354/00; G09G 2380/10
See application file for complete search history.

(56) References Cited

U.S. PATENT DOCUMENTS

2016/0159206 A1* 6/2016 Nakashima ............ G02B 26/02
250/201.1

\* cited by examiner

*Primary Examiner* — Tony Ko
(74) *Attorney, Agent, or Firm* — Laurence S. Roach, Esq.

(57) ABSTRACT

Examples of the present disclosure relate to a system in a vehicle for reducing oncoming light. The system includes a windshield. The system includes a sensor installed in the vehicle to detect a light from an oncoming light source. The system includes a wave cancellation unit to generate destructive interference light based on the detected oncoming light source and project the destructive interference light into the windshield.

18 Claims, 5 Drawing Sheets

500

502 — DETECT, VIA SENSOR, ONCOMING LIGHT

504 — GENERATE, VIA NOISE CANCELLATION UNIT, DESTRUCTIVE INTERFERENCE LIGHT BASED ON DETECTED ONCOMING LIGHT

506 — DETECT, VIA PROCESSOR, ONCOMING LIGHT DOES NOT EXCEED THRESHOLD

508 — STOP GENERATING DESTRUCTIVE LIGHT

ONCOMING LIGHT REDUCTION USING DESTRUCTIVE INTERFERENCE

CROSS-REFERENCE TO RELATED APPLICATIONS

This application claims the benefit of U.S. Provisional Application No. 63/356,252, filed on Jun. 28, 2022, which the disclosure of which is hereby incorporated by reference in its entirety for all purposes.

FIELD OF THE INVENTION

The present disclosure generally relates to techniques for reduction of oncoming light. More specifically, the present disclosure describes a wave cancellation unit for oncoming lights in a vehicle.

BACKGROUND

This section is intended to introduce the reader to various aspects of art, which may be related to various aspects of the present disclosure, which are described and/or claimed below. This discussion is believed to be helpful in providing the reader with background information to facilitate a better understanding of the various aspects of the present disclosure. Accordingly, it can be understood that these statements are to be read in this light, and not as admissions of prior art.

Head up displays (HUDs) provide information to users and can include projecting a virtual image. The virtual image may be projected to appear at a location viewable to a user, such as a driver, where the virtual image can be seen while the user views another area in physical space. In the example of a driver of a vehicle, the HUD may display an image that is viewable as the driver also views the road ahead, thus avoiding the distraction of taking their eyes off the road to see information traditionally displayed by a cluster and screens on a central panel.

SUMMARY

Generally, the present techniques relate to a system in a vehicle for reducing oncoming light. The system includes a windshield. The system includes a sensor installed in the vehicle to detect light from an oncoming light source. The system further includes a wave cancellation unit to generate destructive interference light based on the detected oncoming light source and project the destructive interference light into the windshield.

The present techniques also include a method for reducing apparent oncoming light in a vehicle. The method includes detecting, via a sensor, oncoming light. The method further includes generating, via a wave cancellation unit, destructive interference light based on the detected oncoming light.

The present techniques also further include a wave cancellation apparatus. The wave cancellation apparatus includes a processor. The wave cancellation apparatus further includes a sensor communicatively connected to the processor. The wave cancellation apparatus also further includes a light generation device communicatively coupled to the processor. The processor is to cause the light generation device to generate a destructive interference light in response to detecting an oncoming light in sensor data from the sensor.

BRIEF DESCRIPTION OF THE DRAWINGS

The above-mentioned and other features and advantages of the present disclosure, and the manner of attaining them, may become apparent and be better understood by reference to the following description of one example of the disclosure in conjunction with the accompanying drawings, where.

Figure 1:
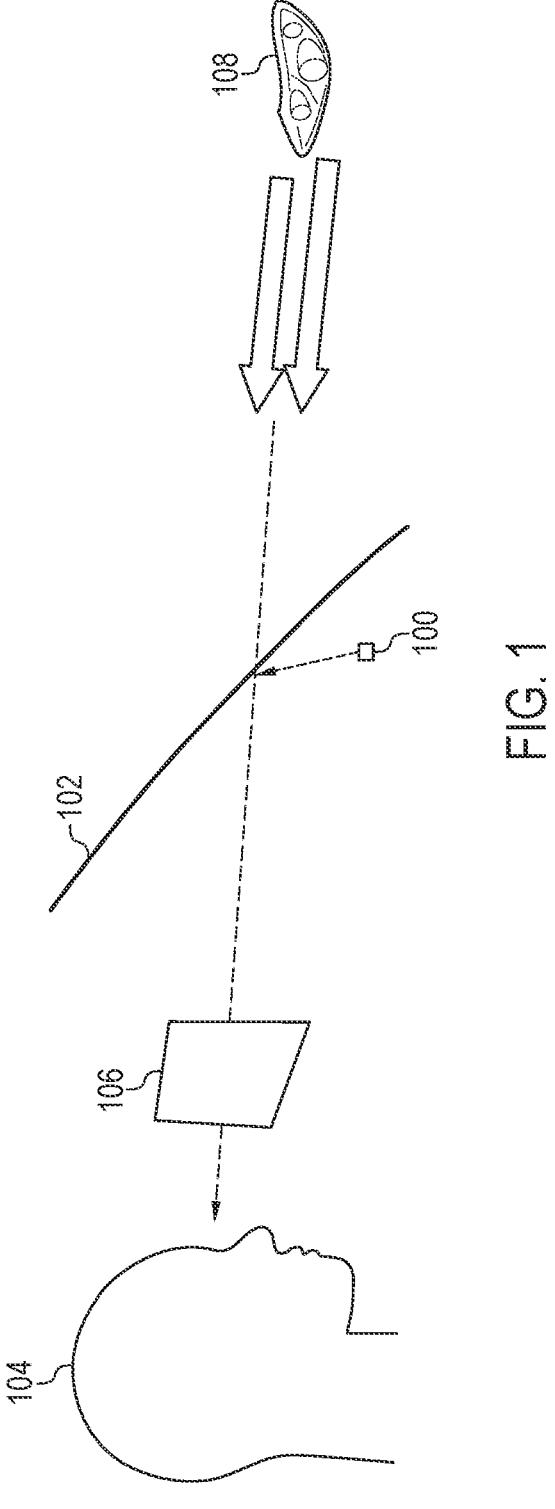
FIG. 1 is an illustration of a head up display for a vehicle, in accordance with embodiments.

Correlating reference characters indicate correlating parts throughout the several views. The exemplifications set out herein illustrate examples of the disclosure, in one form, and such exemplifications are not to be construed as limiting in any manner the scope of the disclosure.

DETAILED DESCRIPTION OF EXAMPLES

One or more specific examples of the present disclosure are described below. In an effort to provide a concise description of these examples, not all features of an actual implementation are described in the specification. It can be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it can be appreciated that such a development effort might be complex and time consuming, and is a routine undertaking of design, fabrication, and manufacture for those of ordinary skill having the benefit of this disclosure.

The present disclosure describes a wave cancellation unit to reduce apparent oncoming headlight intensity for a vehicle. In particular, headlights from oncoming traffic can be blinding and unsafe. A sensor in the vehicle can detect the brightness of headlights from oncoming traffic and use destructive interference light waves from a dash or head up display (HUD) to reduce the overall brightness level seen by the driver. As used herein, destructive interference light refers to light waves that are offset in phase from a detected light source to be reduced. Preferably, the maxima of the waves of such destructive light may be 180 degrees out of phase with the light source to be reduced or cancelled. For example, HUDs may generate virtual images. The virtual image appears to the driver as a translucent image floating within the driver's field of view while looking through the windshield. In various examples, the head up display of a vehicle may include a wave cancellation unit that can reduce the apparent brightness of oncoming headlights to a driver by reflecting destructive light from the vehicle's windshield. In this way, the driver can view the road at night without looking away from particularly bright headlights. In various examples, the brightness of the oncoming headlights may be determined by the intensity of the light detected at a light sensor. The brightness of the destructive light projected onto the windshield can be adjusted so that the oncoming headlights are reduced in brightness, without creating additional distracting light on the windshield. Thus, the driver's eyes can continue looking at the road ahead.

In various examples, the wave cancellation unit is also configured to detect emergency vehicle lights. Accordingly, the lights of emergency vehicles may optionally be allowed to appear at full brightness in order to enable the driver to notice emergency vehicles while driving. In some examples, the wavelengths of emergency vehicle lights may alternatively be excluded by design from the wave cancellation unit.

FIG. 1 is an illustration of a head up display for a vehicle, in accordance with embodiments. The head up display 100 can be positioned in the vicinity of the vehicle's windshield 102. For example, the head up display 100 can be disposed within a recess in the vehicle's dashboard. The head up display 100 is positioned so that light projected toward the windshield 102 will be reflected off of the windshield toward the driver 104. This usually creates a translucent virtual image visible within an eye box 106 area of the vehicle that may appear to be superimposed over the windshield or may appear to hover inside the vehicle. For example, the eye box 106 may be a static area within the vehicle in which a user's eyes may be in order to be able to view information from the HUD projected onto the windshield. In various examples, the eye box 106 may also include a destructive light generated by the head up display 100 that interacts with light from oncoming headlights 108. The interaction between the destructive light generated by the HUD 100 and the oncoming headlights 108 may result in an apparent reduced intensity of light for the driver 104. A more detailed description of the head up display 100 is provided in relation to FIG. 2.

Figure 2:
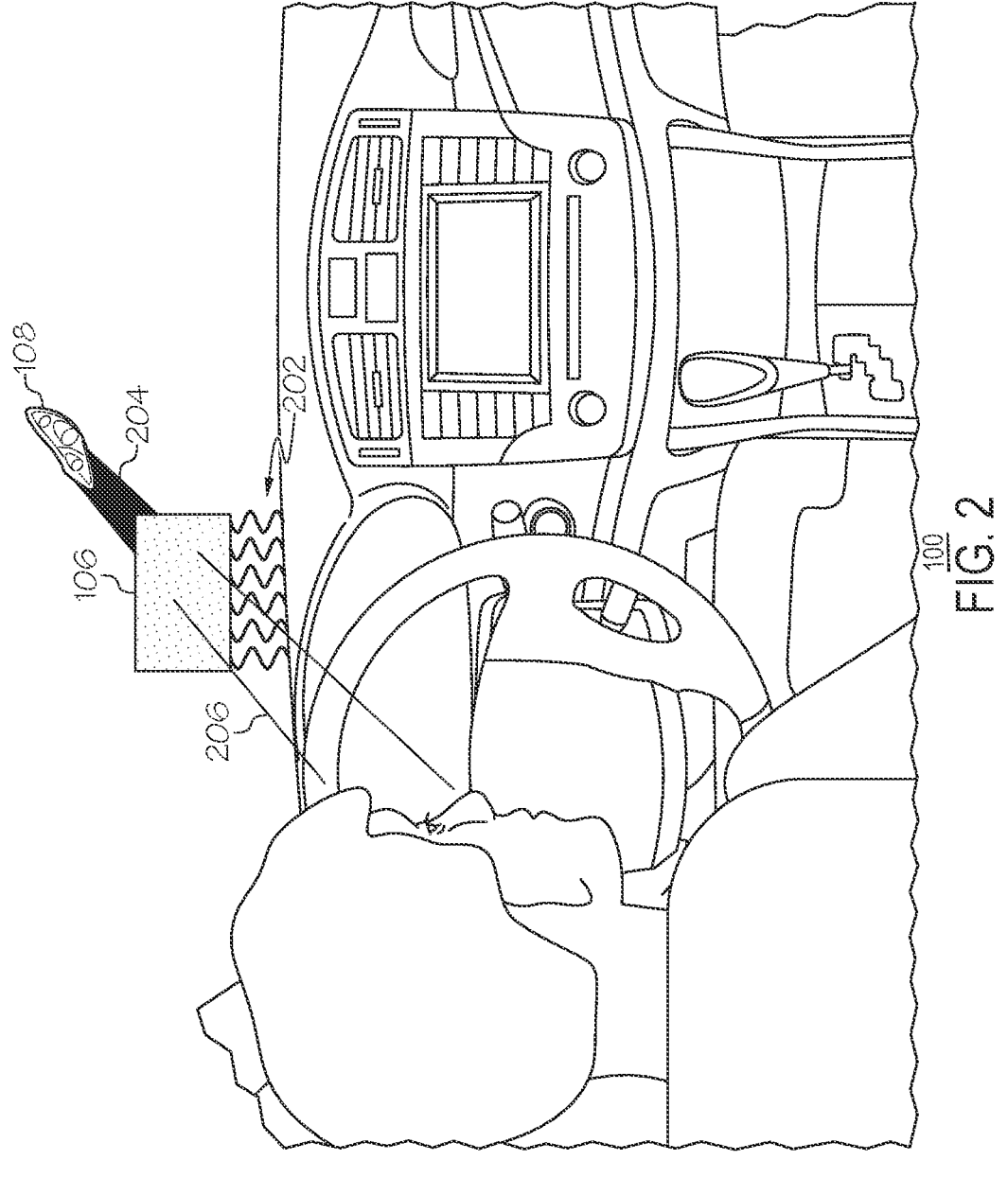
FIG. 2 is a front view of an example interior of a vehicle with a wave cancellation unit, in accordance with embodiments.

FIG. 2 is an interior of a vehicle with a wave cancellation unit, in accordance with embodiments. The head up display 100 includes a wave cancellation unit shown generating destructive interference light 202. The destructive interference light 202 is shown interacting with oncoming headlight 204 from the headlights 108 within the eye box 106 of a windshield of the car. A resulting reduced light 206 is shown emanating through the eye box 106 towards the face of the driver.

In various examples, the destructive interference light 202 may be produced by a destructive light generator component of a wave cancellation unit. For example, the wave cancellation unit may include an oncoming light detector and a destructive interference light generator. In some examples, the wave cancellation unit may be a stand-alone device or a part of an HUD of a vehicle. In the example of an HUD, the destructive interference light 202 may be projected in addition to other information projected by the HUD on the windshield within the eye box 106. In other examples, a stand-alone wave cancellation unit may include a sensor such as a video camera to detect oncoming light and its intensity.

It will be appreciated the particular oncoming light scenarios and techniques for reduction of oncoming headlights described herein are only examples. Various additional techniques for reducing detected oncoming light through the use of destructive interference can be implemented depending on the design considerations of a particular implementation and the particular scenarios to be addressed. In various examples, a stand-alone wave cancellation unit may alternatively be used in vehicles with or without an HUD.

Figure 3:
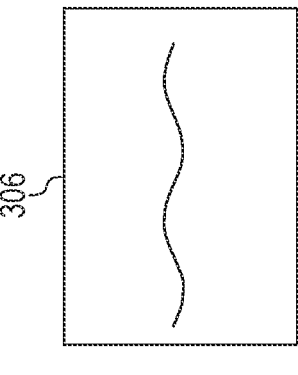
FIG. 3 is an example wave cancellation of light using destructive interference.
Figure 3:
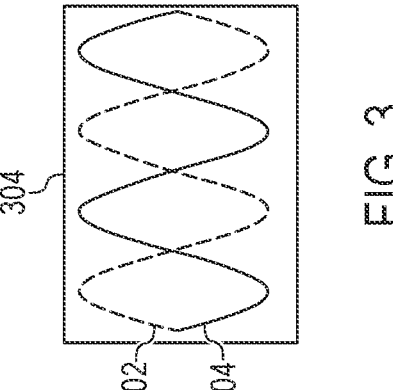

FIG. 3 is an example wave cancellation of light using destructive interference. At block 302, a waveform of light from an oncoming headlight 204 is shown. At block 304, a destructive interference between the light from the oncoming headlight 204 and a generated destructive interference light 202 is shown. At block 306, a reduced waveform corresponding to the light from the oncoming headlight 204 is shown. In some examples, the waveform at block 306 may be substantially flat, indicating substantially reduced or substantially cancelled light.

In some examples, the oncoming headlight 204 may include multiple wavelengths of light. Thus, in some examples, one or more wavelengths of the oncoming headlight 204 may be generated as destructive interference light 202 and combined with the oncoming light at block 304 to result in an apparent oncoming light of a different color with less intensity. For example, the generated destructive interference light 202 may be generated within green wavelengths, such that the resulting light at block 306 from the oncoming headlight may be a purple color, but reduced in intensity. As one advantage, using green wavelengths may enable lights such as emergency vehicle lights to be excluded from destructive interference by design. In various examples, the specific wavelengths of an oncoming headlight 204 may be analyzed any subset of the detected wavelengths may be used in generating the destructive interference light 202.

Figure 4:
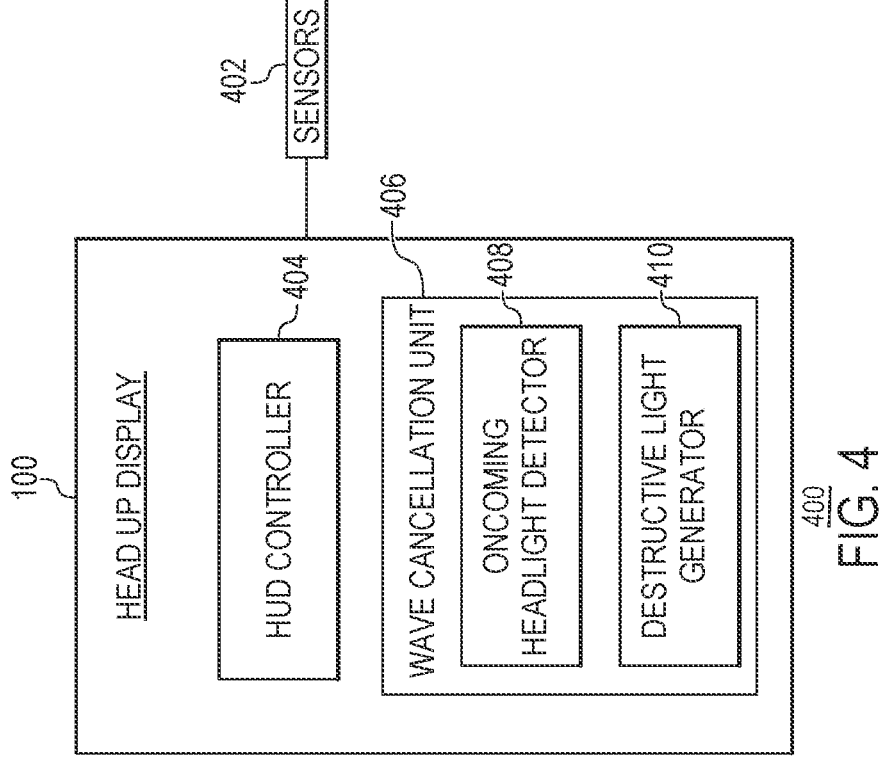
FIG. 4 is a block diagram of an example HUD system for wave cancellation of oncoming headlights in accordance with embodiments.

FIG. 4 is a block diagram of an example HUD system for wave cancellation of oncoming headlights in accordance with embodiments. The HUD system 400 includes the head up display 100 coupled to one or more sensors 402. The sensors 402 are included in a vehicle and may include an electronic sensing device for generating and transmitting information to the head up display 100. For example, the sensors 402 may include a light sensor, such as those in a video camera. In some examples, sensors 402 can include a sensor for detecting information about the vehicle such as vehicle speed, rotational speed of the engine, tire pressure sensors, fuel level sensors, and other sensors for collecting data that would typically be displayed in an instrument cluster. The sensors 402 can include sensors for detecting information about the vehicles surroundings, such cameras, proximity sensors, radar, or light detection and ranging (LIDAR) systems, among other sensors. The sensors 402 can also include systems for detecting radio frequency (RF) communications, for example, from other vehicles or roadway infrastructure. The sensors 402 may be coupled to the head up display 100 directly, or information from the sensors 402 may be transmitted to the head up display 100 from other processing units, such as one or more of the vehicle's Electronic Control Units (ECUs). In some examples, the sensors 402 may also include sensors of an eye tracking system within the vehicle. For example, the eye tracking system may track the eye gaze of a driver of the vehicle.

The head up display 100 includes a HUD controller 404 and a wave cancellation unit 406. The wave cancellation unit 406 includes an oncoming headlight detector 408 and a destructive light generator 410. The HUD controller 404 may be implemented as processing hardware or a combination of hardware and software. For example, the HUD controller 404 may be implemented on a dedicated microprocessor such as an Application Specific Integrated Circuit (ASIC), as software or firmware executing on a general purpose processor, and the like. The HUD controller 404 can receive information from the sensors 402 and control the wave cancellation unit 406 in accordance with its programming.

The HUD 100 reduces visible oncoming headlights for the user by reflecting a projection of destructive interference light toward the windshield, which reflects the light to the user. The destructive interference light may interact with the oncoming light to substantially reduce or cancel the oncoming lights. In various examples, the HUD controller 404 can control the destructive light generator 408 to reduce a variety of light sources. For example, the HUD controller 404 can control the destructive light generator 408 to reduce light from oncoming headlights. In some examples, the HUD controller 404 may also control the destructive light generator 408 to prevent certain sources of light from being reduced. For example, lights from emergency vehicles, such as ambulances or police vehicles, may be allowed to be seen with full intensity so as to alert the driver in emergencies. In various examples, the destructive interference light is projected such that the oncoming light is apparently reduced within an eye box of the HUD 100.

Figure 5:
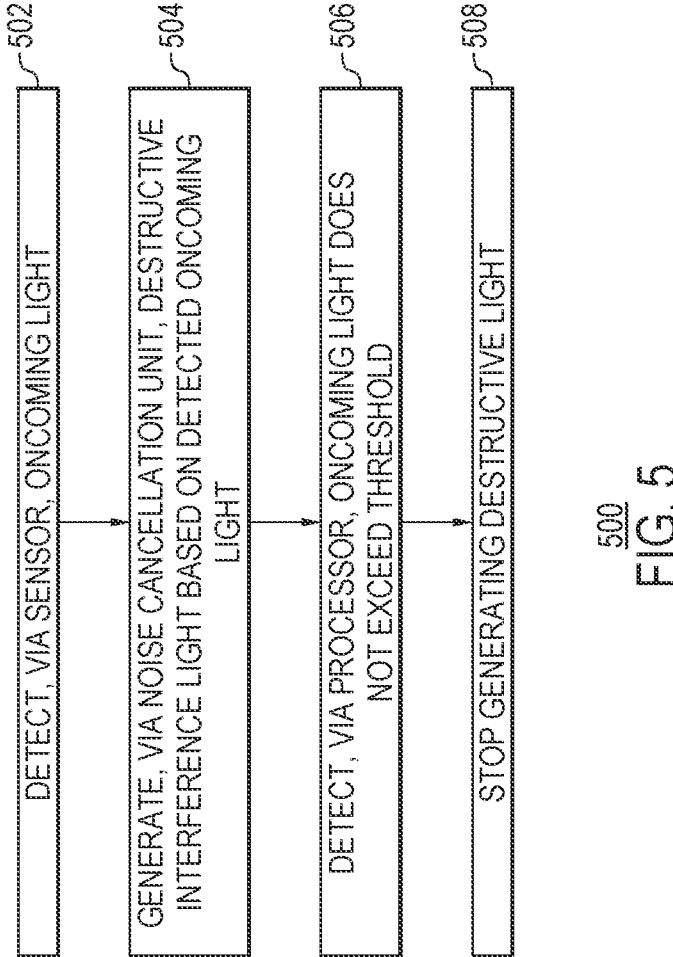
FIG. 5 is a process flow diagram for an example method of reducing oncoming headlight brightness.

FIG. 5 is a process flow diagram for an example method of operating a head up display, in accordance with embodiments. As described above, the head up display includes a picture generation unit and boundary indicators disposed around a perimeter of the picture generation unit. The method 500 may be performed by logic implemented in the head up display alone or combination with other processing units in a vehicle. The logic is embodied in hardware, such as logic circuitry or one or more processors configured to execute instructions stored in a non-transitory, computer-readable medium. The process may begin at block 502.

At block 502, a processor detects, via a sensor, an oncoming light. For example, sensor data may be received at a processor of a wave cancellation unit. In some examples, the wave cancellation unit may be part of a head up display. In various examples, the sensor data may be received from one or more sensors and/or processing units disposed in the vehicle, and can include any combination of data, such as proximity and distance data, image data, wireless communication data, and others. The sensor data may be raw data received directly from the sensors or may be pre-processed by other processing units within the vehicle. In some examples, the processor may detect that the oncoming light exceeds a threshold level of intensity.

At block 504, a destructive light is generated in response to the detected oncoming light. In some examples, the destructive light may be generated as part of a virtual image of a head up display. In various example, the destructive light may be generated and projected onto the windshield from a separate wave cancellation unit in a dash of a vehicle. In various examples, the destructive interference light may be generated in response to detecting that the oncoming light exceeds a threshold level of intensity. In some examples, the generated interference light may be combined with information to be displayed on a windshield and the combined light projected onto a head up display. In various examples, a phase offset of the destructive interference light with respect to the detected oncoming light is based on a light intensity threshold and a detected intensity of the oncoming light. In some examples, the destructive interference light reduces the detected oncoming light to an intensity that does not exceed a threshold.

At block 506, a processor detects oncoming light does not exceed a threshold. For example, an oncoming vehicle may have switched from high beams to low beam headlight usage. In this example, the processor may detect that the high beams are no longer being used.

At block 508, the processor stops generating the destructive light. For example, the HUD may display a virtual image without the destructive light. In some examples, the wave cancellation unit in the dash may stop projecting the destructive light within the eye box.

The method 500 should not be interpreted as meaning that the blocks are necessarily performed in the order shown. Furthermore, fewer or greater actions can be included in the method 500 depending on the design considerations of a particular implementation. For example, the method 500 may further include detecting that an oncoming light is an emergency vehicle and selectively disabling the wave cancellation unit in response to detecting the emergency vehicle. In some examples, the method 500 may also include detecting that an oncoming light is a street light and selectively disabling the wave cancellation unit in response to detecting the street light. In addition, in various examples, the method 500 may include detecting, via gaze detection unit, a gaze of the driver and selectively generating the destructive interference light based on the gaze of the driver.

While the invention may be susceptible to various modifications and alternative forms, specific embodiments have been shown by way of example. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system in a vehicle for reducing oncoming light, comprising:
   a windshield;
   a sensor installed in the vehicle to detect light from an oncoming light source; and
   a wave cancellation unit to generate destructive interference light based on the detected light from the oncoming light source and project the destructive interference light into the windshield, wherein the generated destructive interference light comprises a waveform with a phase offset to the detected light from the oncoming light source.

2. The system of claim 1, wherein the phase offset comprises a 180 degree offset calculated with respect to a position of a virtual image projected by a head up display.

3. The system of claim 1, wherein the sensor is to detect an intensity of the light from the oncoming light source, wherein an intensity of the generated destructive interference light is based on the detected intensity of the light from the oncoming light source.

4. The system of claim 1, wherein the generated destructive interference light comprises a partial subset of visible spectrum.

5. The system of claim 1, wherein the vehicle uses data gathered from the sensor to detect an emergency vehicle, wherein the wave cancellation unit is disabled in response to detecting the emergency vehicle.

6. The system of claim 1, comprising an eye gaze detection unit, wherein the destructive interference light comprises a pattern generated based on a detected direction of a gaze of a driver.

7. A method for reducing apparent oncoming light in a vehicle, comprising:
   detecting, via a sensor, oncoming light; and
   generating, via a wave cancellation unit, destructive interference light based on the detected oncoming light, wherein the generated destructive interference light comprises a waveform with a phase offset to the detected oncoming light.

8. The method of claim 7, comprising generating the destructive interference light in response to detecting that the oncoming light exceeds a threshold level of intensity.

9. The method of claim 7, comprising combining the generated destructive interference light with information to be displayed on a windshield and projecting the combined light onto a head up display.

10. The method of claim 7, wherein the phase offset of the destructive interference light with respect to the detected oncoming light is based on a light intensity threshold and a detected intensity of the oncoming light.

11. The method of claim 7, wherein the destructive interference light reduces the detected oncoming light to an intensity that does not exceed a threshold.

12. The method of claim 7, comprising detecting that an oncoming light is an emergency vehicle and selectively disabling the wave cancellation unit in response to detecting the emergency vehicle.

13. The method of claim 7, comprising detecting that an oncoming light is a street light and selectively disabling the wave cancellation unit in response to detecting the street light.

14. The method of claim 7, comprising detecting, via gaze detection unit, a gaze of a driver and selectively generating the destructive interference light based on the gaze of the driver.

15. A wave cancellation apparatus, comprising:
a processor;
a sensor communicatively connected to the processor; and
a light generation device communicatively coupled to the processor, wherein the processor is to cause the light generation device to generate a destructive interference light in response to detecting an oncoming light in sensor data from the sensor, wherein the generated destructive interference light comprises a waveform with a phase offset to the detected oncoming light.

16. The wave cancellation apparatus of claim 15, wherein the destructive interference light is projected such that the oncoming light is apparently reduced within an eye box of a head up display system.

17. The wave cancellation apparatus of claim 15, wherein the oncoming light comprises a headlight of an oncoming vehicle.

18. The wave cancellation apparatus of claim 15, wherein the sensor is within a video camera coupled to a front of a vehicle.

\* \* \* \* \*